(12) United States Patent
Allen

(10) Patent No.: US 8,061,936 B2
(45) Date of Patent: Nov. 22, 2011

(54) BROACH SHAVING APPARATUS

(75) Inventor: Boyd K. Allen, North Adams, MI (US)

(73) Assignee: Utica Enterprises, Inc., Shelby Township, MI (US)

( * ) Notice: Subject to any disclaimer, the term of this patent is extended or adjusted under 35 U.S.C. 154(b) by 504 days.

(21) Appl. No.: 12/362,864

(22) Filed: Jan. 30, 2009

(65) Prior Publication Data

US 2010/0196106 A1    Aug. 5, 2010

(51) Int. Cl.
*B23P 15/14* (2006.01)
(52) U.S. Cl. .......................... 407/14; 409/259
(58) Field of Classification Search .............. 407/13, 407/14, 15, 16, 17, 18, 19; 409/59, 60, 259, 409/287
See application file for complete search history.

(56) References Cited

U.S. PATENT DOCUMENTS

| 2,304,185 | A | * | 12/1942 | Lee ................................ 407/14 |
| 2,461,320 | A |   | 2/1949  | Green |
| 2,547,509 | A | * | 4/1951  | Tozer ........................... 409/276 |
| 2,587,570 | A | * | 2/1952  | Iversen ........................ 407/14 |
| 3,332,129 | A | * | 7/1967  | Psenka ......................... 407/14 |
| 3,961,404 | A | * | 6/1976  | Goloff et al. ............. 29/888.049 |
| 4,518,289 | A |   | 5/1985  | Gabriele |
| 7,402,011 | B2 |  | 7/2008  | Thompson et al. |

FOREIGN PATENT DOCUMENTS

JP        2007210048 A  *  8/2007

* cited by examiner

*Primary Examiner* — Boyer D Ashley
*Assistant Examiner* — Jennifer Swinney
(74) *Attorney, Agent, or Firm* — Brooks Kushman P.C.

(57) ABSTRACT

A broach (20) includes a rough broach section (32) having toothed broach inserts (38) and guides (40) that provide rough broaching of gear teeth, and a shave ring section (34) of the broach includes annular shave rings (60) having internal teeth (62) for providing final shaving of the gear teeth and also having guides (70) that maintain the gear radially centered during the final shaving.

12 Claims, 6 Drawing Sheets

BROACH SHAVING APPARATUS

BACKGROUND OF THE INVENTION

1. Field of the Invention

This invention relates to a broach shave ring section and also relates to a broach including a rough broach section and the broach shave ring section for broaching gear teeth, splines and the like on a gear or other round workpiece.

2. Background Art

Broaches for forming external gear teeth, splines and the like on a gear or other round workpiece conventionally include a round housing, that is referred to as a pot, for supporting internal elongated toothed inserts spaced around a central axis and secured to the housing by threaded bolts. The elongated toothed inserts have teeth of progressively increasing height from an entry end of the broach to an exit end. With such a construction it is relatively easy to provide guides between certain inserts for slidably contacting the workpiece to provide centering thereof as the inserts perform the rough broaching.

After rough broaching as described above, it is also now conventional to utilize a broach shave ring section that is embodied by a plurality of annular shave rings each of which has teeth spaced about the central axis with all of the teeth of each shave ring of the same size, but with the teeth of one shave ring to the next shave ring having an increasing size along the direction of movement of the workpiece through the shave ring section. As a result of the multiple annular shave rings of a broach shave ring section, workpieces have not previously been guided through shave ring sections so as to provide centering.

Prior art patents noted during an investigation conducted in connection with the present invention include U.S. Pat. No. 2,461,320 Green; U.S. Pat. No. 2,547,509 Tozer; U.S. Pat. No. 4,518,289 Gabriele; and U.S. Pat. No. 7,402,011 Thompson et al.

SUMMARY OF THE INVENTION

An object of the present invention is to provide an improved broach shave ring section.

In carrying out the above object, the broach shave ring section of the invention includes a plurality of annular shave rings positioned along a central axis between entry and exit ends of the shave ring section. Each shave ring has internal teeth and the teeth of the shave rings have progressively increasing size from the entry end of the shave ring section toward its exit end so as to perform final shaving of gear teeth on a rough broached gear. At least three guide grooves extend axially through each shave ring at circumferentially spaced locations about the central axis and in alignment with the guide grooves of the other shave rings from one shave ring axially along the central axis to the next shave ring, and each guide groove has a radial inwardly opening shape toward the central axis. Guides are respectively received within the guide grooves and have guide portions located at the inwardly opening shapes thereof to contact respective gear teeth of the gear to maintain the gear radially centered during the final shaving.

As disclosed, the guide grooves in the shave rings and the guides therein are equally circumferentially spaced from each other about the central axis. There are four guide grooves in the shave rings and four guides therein as disclosed, with the four guide grooves and the four guides therein equally circumferentially spaced 90 degrees from each other about the central axis.

The guide grooves in the shave rings as disclosed each have a mounting portion located radially outward from the internal teeth of the shave ring and having a larger size than the radial inwardly opening shape thereof, and the radial inwardly opening shape of each guide groove is circumferentially between associated internal teeth of the shave ring. Also, each guide includes a mounting portion received within the mounting portions of the associated axially aligned mounting grooves of the shave rings, and each guide includes a guide portion of a smaller size than the mounting portion thereof and located within the associated radial inwardly opening shape of the mounting grooves to contact and guide the radial outer extremity of an associated gear tooth of the gear to provide the gear centering.

The mounting portions of the shave ring guide grooves and the mounting portions of the guides as disclosed have generally square shapes, and the guide portions have inwardly projecting shapes extending radially inward through the inwardly opening shapes of the mounting grooves to contact the radial outer extremities of associated gear teeth of the gear to provide the gear centering. Furthermore, each guide as disclosed includes an axial end having a threaded hole that facilitates removal of the guide from the associated guide grooves of the shave rings.

The broach shave ring section as disclosed includes an annular support ring in which the shave rings are received. The support ring includes a plurality of internal locator slots spaced circumferentially about the central axis, and a plurality of locator keys are respectively received within the locator slots. Inner extremities of the locator keys contact and position the shave rings. The support ring also includes an internal indexing slot located circumferentially between two of the locator slots. Each shave ring includes a radial outer indexing slot circumferentially aligned with the indexing slots of the other shave rings, and an indexing key is received within the indexing slot of the support ring and within the indexing slots of the shave rings to provide axial alignment of the internal teeth of the shave rings.

As disclosed, each locator key includes an axial end having a threaded hole that facilitates removal of the locator keys from the locator slots of the support ring, and the indexing key includes an axial end having a threaded hole that facilitates removal of the indexing key from the indexing slot of the support ring and from the indexing slots of the shave rings.

Another object of the present invention is to provide an improved broach.

In carrying out the immediately preceding object, the broach of the invention includes a rough broach section having entry and exit ends. The rough broach section includes a generally annular support and toothed inserts mounted by the support extending between its entry and exit ends to rough broach a gear blank with outer gear teeth.

The broach also includes a shave ring section having entry and exit ends with its entry end at the exit end of the rough broach section. The shave ring section includes a generally annular support and a plurality of annular shave rings are mounted by the associated support positioned along a central axis between the entry and exit ends of the shave ring section. Each shave ring has internal teeth and the teeth of the shave rings have progressively increasing size from the entry end of the shave ring section toward its exit end so as to perform final shaving of the gear teeth of the rough broached gear. At least three guide grooves extend axially through each shave ring at circumferentially spaced locations equally spaced about the central axis and in alignment with the guide grooves of the other shave rings from one shave ring axially along the central axis to the next shave ring. Each guide groove has a radial inwardly opening shape toward the central axis. Each guide groove has a mounting portion located radially outward from the internal teeth of the shave ring and having a larger size than its radial inwardly opening shape, and the radial inwardly opening shape of each guide groove is circumferentially between associated internal teeth of the shave ring. Guides of the shave ring section are respectively received within the guide grooves of the shave rings and have guide portions located at the inwardly opening shapes of the mounting grooves to contact respective gear teeth of the gear to maintain the gear radially centered during the final shaving. Each guide includes a mounting portion received within the mounting portions of the associated axially aligned mounting grooves of the shave rings, and each guide includes a guide portion of a smaller size than the mounting portion thereof and located within the associated radial inwardly opening shapes of the guide grooves of the shave rings to contact and guide the radial outer extremity of an associated gear tooth of the gear to provide the gear centering.

The annular support of the shave ring section of the broach includes an annular support ring of a unitary construction in which the shave rings are received. The support ring includes a plurality of internal locator slots spaced circumferentially about the central axis, and a plurality of locator keys are respectively received within the locator slots and have inner extremities that contact and position the shave rings. The support ring also includes an internal indexing slot located circumferentially between two of the locator slots. Each shave ring includes a radial outer indexing slot circumferentially aligned with the indexing slots of the other shave rings, and an indexing key is received within the indexing slot of the support ring and within the indexing slots of the shave rings to provide alignment of the internal teeth of the shave ring.

The objects, features and advantages of the present invention are readily apparent from the following detailed description of the preferred embodiment when taken in connection with the accompanying drawings.

DETAILED DESCRIPTION OF THE PREFERRED EMBODIMENT

Figure 1:
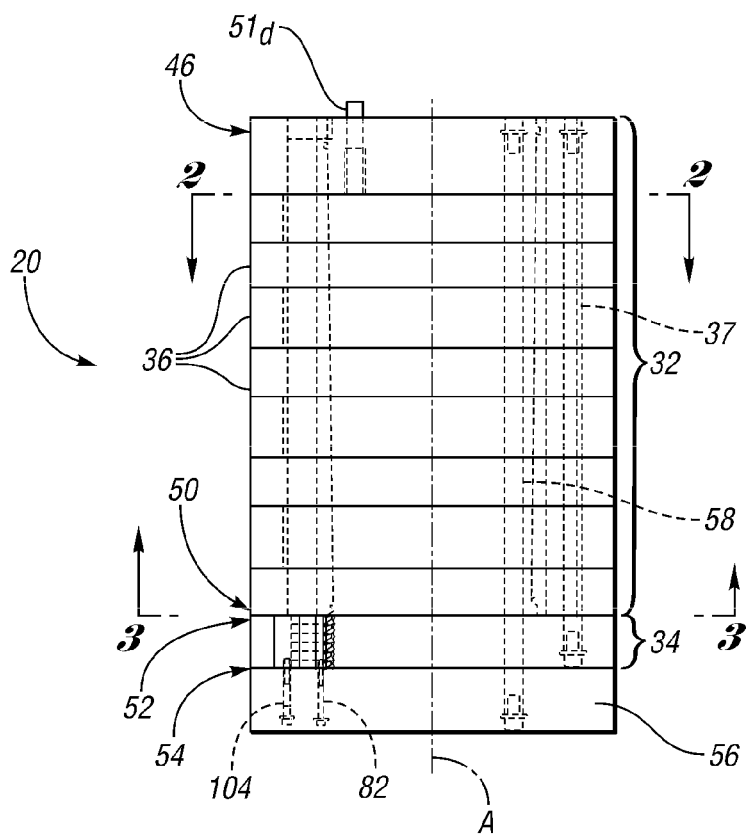
FIG. 1 is a partially broken away elevational view of a broach that includes a rough broach section and a shave ring section constructed in accordance with the present invention.
Figure 15:
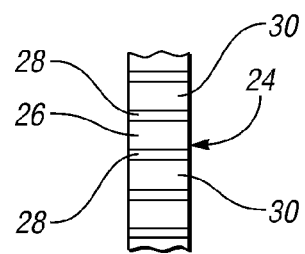
FIG. 15 is an inwardly looking radial view of the broach teeth taken along the direction of line 15-15 in FIG. 14.
Figure 14:
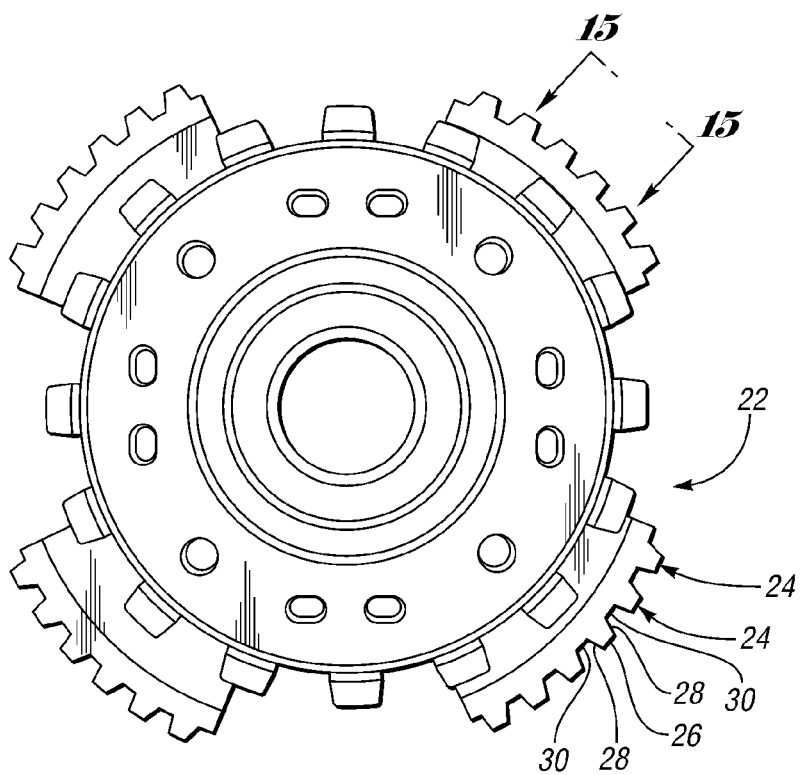
FIG. 14 is an axial view of a gear whose teeth are broached by the broach illustrated in FIGS. 1 through 13.

With reference to FIG. 1, a broach generally indicated by 20 is constructed in accordance with the present invention to perform broaching of gear teeth such as on the gear 22 illustrated in FIG. 14 whose teeth are identified at 24. These teeth 24 as shown in FIG. 15 have outer radial extremities 26 defining top lands, inclined faces 28, and inner extremities 30 defining bottom lands extending between the teeth. It should be appreciated that as used herein the term gear and gear teeth also applies to other round workpieces having splines or other constructions similar to gear teeth.

With continuing reference to FIG. 1, the broach 20 has a central axis A and includes a rough broach section 32 that performs the initial rough broaching of gear teeth and a shave ring section 34 that provides final gear teeth broaching or shaving to complete the broaching operation.

Any type of broach press can be used to move the gear through the broach press to perform the broaching in both the rough broach section 32 and the shave ring section 34. As disclosed, the gear is moved downward, but it is also possible for the gear to be moved upwardly to perform the broaching. In the latter case, all of the "downward" and "upward" terms as used herein are of course reversed.

Figure 2:
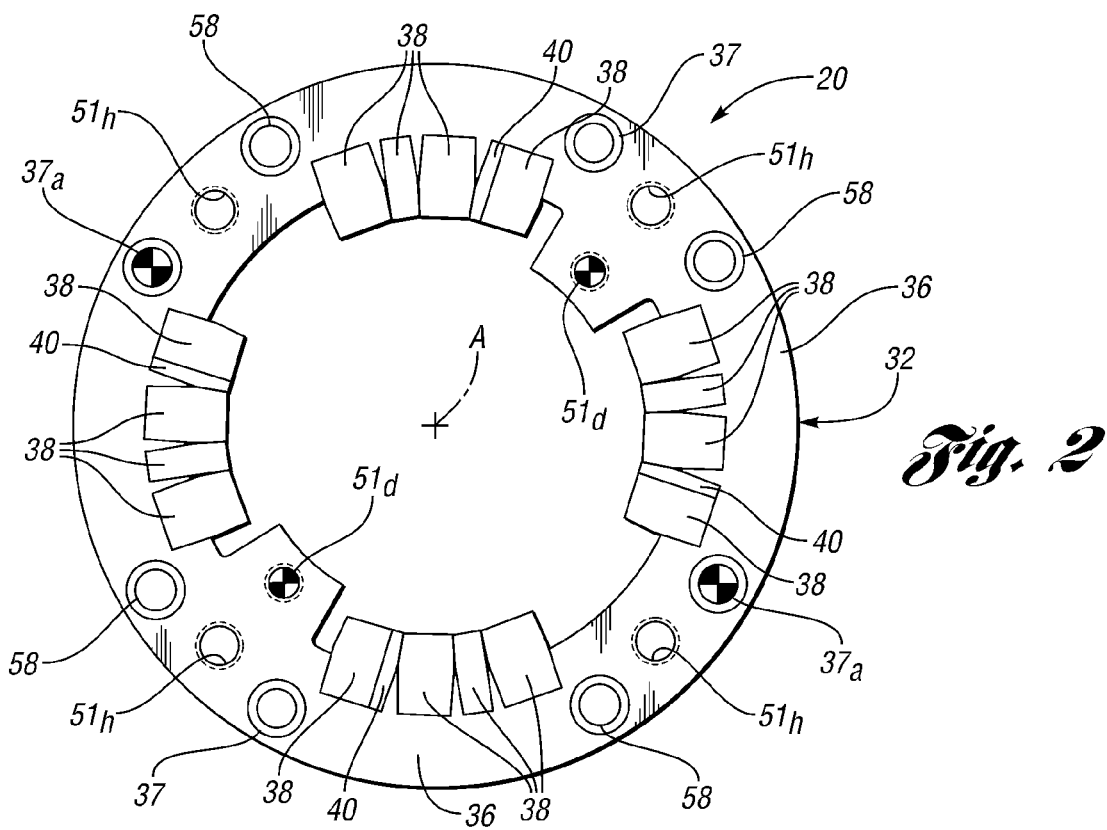
FIG. 2 is a sectional view through the broach looking downwardly along the direction of line 2-2 in FIG. 1 at an entry end of the rough broach section.
Figure 3:
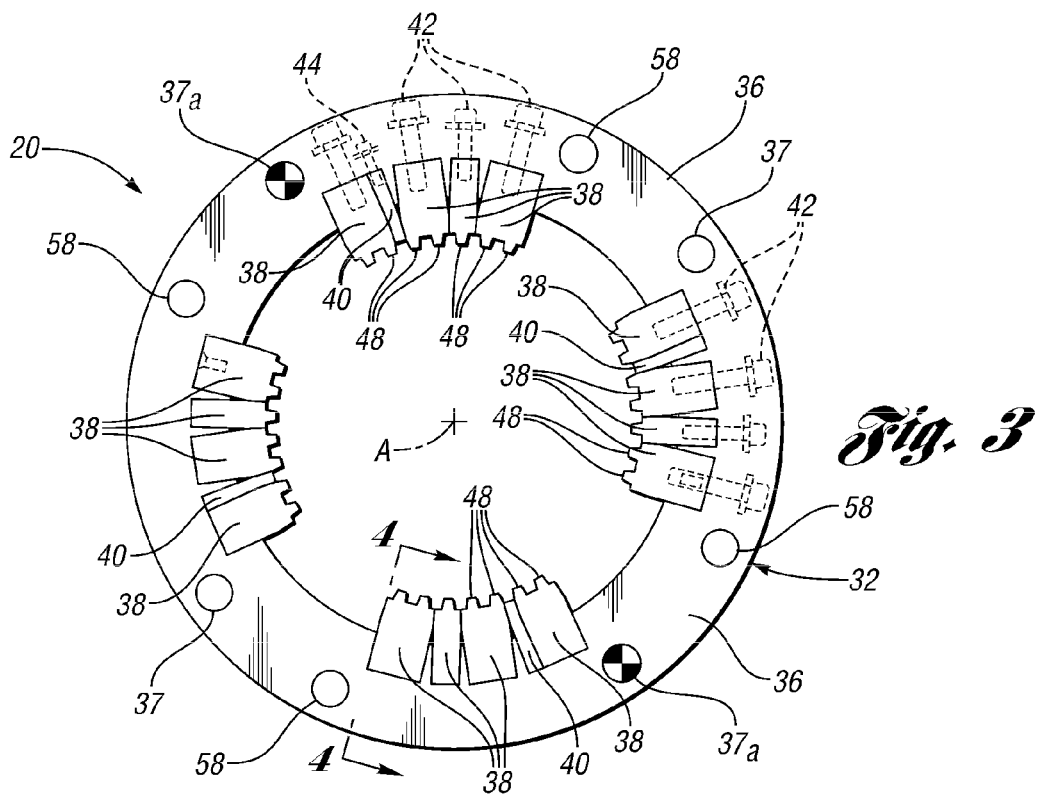
FIG. 3 is a sectional view through the broach looking upwardly at an exit end of the rough broach section.

The rough broach section 32 shown in FIG. 1 includes a plurality of generally annular support rings 36 which are referred to in the broaching industry as wafers and spacers. These support rings 36 are secured to each other in a stacked relationship by connector dowels 37. Some of the support rings 36 as illustrated in FIGS. 2 and 3 are constructed to receive toothed inserts 38 and also receive guides 40. Both the toothed inserts 38 and the guides 40 have elongated constructions as shown by the toothed insert 38 in FIG. 4. Also, some of the support rings 36 function as spacers so as not to require machining of the inner configuration for receiving the toothed inserts 38 and guides 40, which thus reduces cost. Bolts 42 and 44 shown by hidden line representation in FIG. 3 respectively secure the toothed inserts 38 and guides 40 within the rough broach section 32. Furthermore, the radial inner extremities of the guides 40 are located slightly radially inward from the radial outer lands between the teeth of toothed inserts 38 so as to provide the centering of the workpiece during the rough broaching. More specifically, the outer round surface of the workpiece is not cut by the radial outer lands between the teeth of toothed inserts 38 so the outer radial lands defining the tops 26 of the gear teeth 24 are the uncut workpiece surface.

As shown in FIG. 2, two of the dowel connectors 37a extend through tight tolerated holes in the support rings 36 and function as alignment dowels, while the other dowel connectors extend through looser toleranced holes in the support rings and thereby reduce the manufacturing cost involved as well as facilitating assembly.

Figure 4:
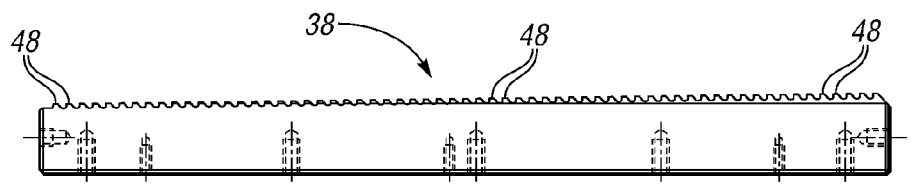
FIG. 4 is a circumferential view taken along the direction of line 4-4 in FIG. 3 to illustrate the construction of elongated toothed inserts that provide the broaching of gear teeth as a gear blank is moved downwardly through the rough broach section from its upper entry end to its lower exit end.

With reference to FIG. 1, the rough broach section 32 has an upper entry end 46 where the toothed inserts 38 have relatively short teeth 48 as shown by the left end of the toothed insert 38 in FIG. 4. The rough broach section 32 also has a lower exit end 50 where the broach insert teeth are taller as shown by the right end of the toothed broach insert 38 in FIG. 4. Between the entry and exit ends, the broach teeth have a progressively increasing height to perform the rough broaching of the gear teeth as the gear is moved downwardly through the broach. As shown in FIG. 3, some of the toothed inserts 38 have only a single line of teeth 48 while others have two lines of teeth along the axial length of the broach. It is also possible to have three, four and sometimes even five lines of teeth on inserts. The number of lines of teeth 48 permit changes for different gears based on the gear diameter and tooth pitch. Also, the upper entry end 46 of the rough broach section has upwardly extending alignment dowels 51d shown in both FIGS. 1 and 2 for providing alignment with the broach press with which the broach is used, and the rough broach section upper end also has threaded holes 51h (FIG. 2) for use in attaching the broach to the broach press.

Figure 5:
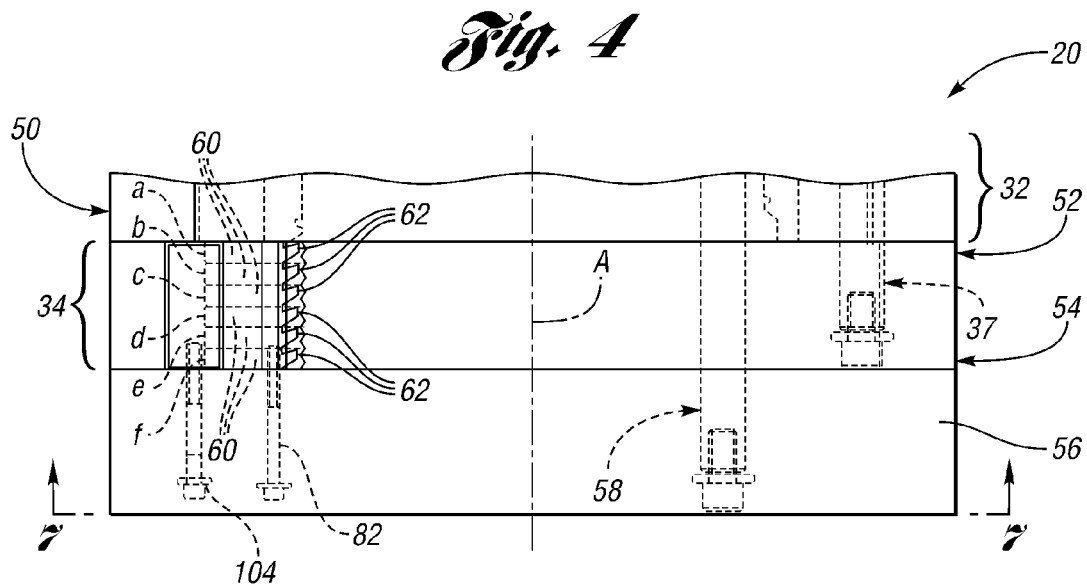
FIG. 5 is an enlarged partial view of the lower portion of FIG. 1 illustrating the shave ring section of the broach.
Figures 8, 9:
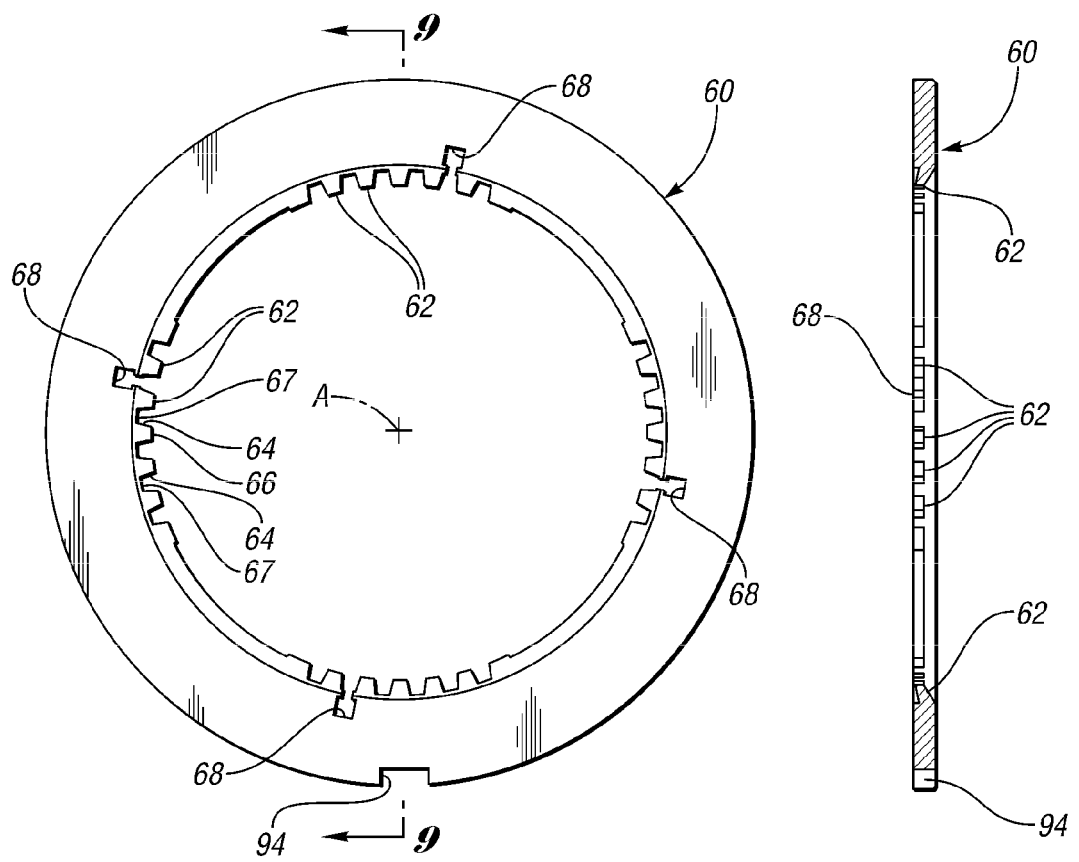
FIG. 8 is an axial view illustrating the construction of shave rings of the shave ring section.
FIG. 9 is a sectional view taken along the direction line 9-9 in FIG. 8 to further illustrate the shave ring construction.
Figure 10:
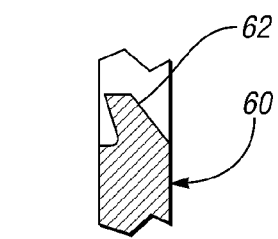
FIG. 10 is an enlarged view of a portion of FIG. 9 illustrating the shave ring tooth construction.
Figure 13:
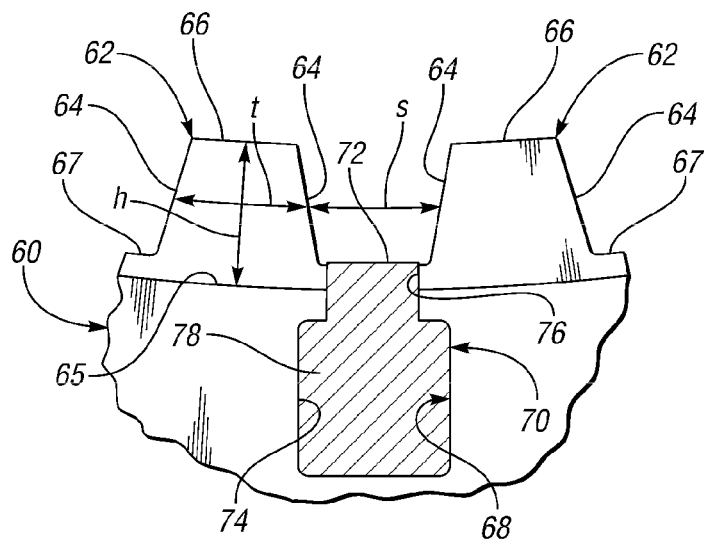
FIG. 13 is a partially axial view of one of the shave rings showing the guide in section to illustrate its location between the shave ring teeth to perform the centering of the gear during the shaving.

With reference to FIG. 5, the shave ring section 34 of the broach has an upper entrance end 52 located adjacent the lower exit end 50 of the rough broach section 32 and has a lower exit end 54 adjacent a backup plate 56 that is secured to the rough broach section and shave ring section by dowel connectors 58. The shave ring section 34 includes a plurality of annular shave rings 60 positioned along the central axis A between the entry and exit ends 52 and 54 of the shave ring section 34. The shave rings 60 each have a unitary construction and are also respectively identified between the entry and exit ends 52 and 54 by identifiers a, b, c, d, e and f. As shown in FIGS. 8-10, the shave rings 60 have internal teeth 62 that have a progressively increasing size from the entry end 52 toward the exit end 54, i.e. from shave ring 60a to 60f. More specifically as best illustrated in FIG. 13, the adjacent teeth 62 have a progressively smaller circumferential spacing s between their oppositely oriented faces 64 so as to progressively shave the gear teeth faces 28 identified in FIG. 15 as the gear 22 is moved downwardly. Thus, from the entry end toward the exit end, the teeth 62 of each shave ring 60 from one shave ring to the next have a progressively increasing circumferential tooth thickness t of each tooth between its own faces 64. The shave teeth 62 have a gullet 65 that has the same diameter for all of the shave rings 60. Between the gullet 65 and the radial inner extremities 66 or top lands of the teeth 62, the tooth height h may be the same or progressively increase from one shave ring 60 to the next from the entry end toward the exit end. In the former case, there is no shaving of the bottom lands 30 between the teeth 24 of the gear 22 shown in FIGS. 14 and 15, while the latter case will shave the bottom lands 30 between the gear teeth. Also, the shave ring teeth 62 have bottom lands 67 (FIG. 13) extending circumferentially therebetween on a diameter that is smaller than the diameter of the gullet 65.

Each shave ring 60 as shown in FIG. 8 has guide grooves 68 extending axially through the shave ring at circumferentially spaced locations about the central axis and in axial alignment with the guide grooves of the other shave rings from one shave ring to the next. Each guide groove 68 as best illustrated in FIG. 13 has a radial inwardly opening shape toward the central axis. Guides 70 are respectively received within the guide grooves and have guide portions 72 located at the inwardly opening shapes thereof to contact respective gear teeth 24 of the gear 22 shown in FIG. 14 to maintain the gear radially centered during the final shaving. The guide portions 72 extend radially inward past the bottom lands 67 and provide the centering of the gear in the shave section. Also, the shave ring guides are aligned with the guides 40 of the rough broach section. Both the rough broach and shave ring guides have the same tolerance spacing with the workpiece which is normally about 0.0002 of an inch radially outward from the largest tolerance size permitted for the workpiece radius, i.e. 0.0004 of an inch on the diameter.

At least three of the guide grooves 68 and associated guides 70 are necessary in order to insure centering of the gear during the shaving so the central axis of the gear is aligned with the central axis of the shave ring section. Best results are provided by an equal circumferentially spaced relationship of the guide grooves 68 and guides 70 from each other about the central axis. As disclosed there are four guide grooves 68 in the shave rings 60 and four guides 70 therein with the circumferential spacing being equal so as to be spaced 90 degrees from each other about the central axis A.

As best illustrated in FIG. 13, the guide grooves 68 each include a mounting portion 74 located radially outward from the internal teeth 62 of the shave ring 60 and having a larger size than the radially inwardly opening shape 76 of the guide groove. Furthermore, the radially inwardly opening shape 76 of each guide groove 68 is located circumferentially between associated internal teeth 62 of the shave ring. Each guide 70 includes a mounting portion 78 received within the mounting portions 74 of the associated axially aligned mounting grooves of the shave rings, and each guide has its guide portions 72 received within the inwardly opening shape 76 of the guide groove between associated broach teeth 62. The guide portion 72 of each guide 70 has a smaller size than its mounting portion 78 and as mentioned above is located within the associated radially inwardly opening shape thereof to contact and guide the radial outer extremity of an associated gear tooth of the gear to provide gear centering during the shaving.

As also best illustrated in FIG. 13, the mounting portion 74 of the shave ring guide groove 68 and the mounting portions 78 of the guide 70 have generally square shapes and the guide portions 72 have inwardly projecting shapes extending radially inward through the inwardly open shape 76 of the mounting grooves to contact the radial outer extremities of associated gear teeth of the gear to provide the gear centering.

Also, the shave ring guides 68 provide more rigidity and accurate positioning of the shave rings 60 with respect to each other about the central axis, which results in enhanced repeatable accuracy in the shaving and less wear of the shave teeth.

Figures 11, 12:
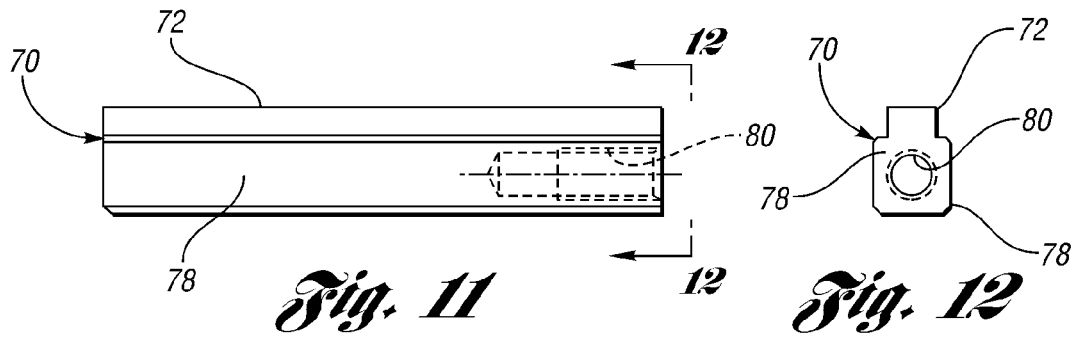
FIG. 11 is a side view of a guide utilized by the shave ring section to center the gear during the shaving performed at the shave ring section.
FIG. 12 is an axial end view of the guide taken along the direction of line 12-12 in FIG. 11.

As shown in FIGS. 11 and 12, each guide 70 includes a threaded hole 80 which, as shown in FIG. 5, allows a threaded bolt 82 to be utilized to facilitate removal of the guide from the associated guide grooves 68 in the shave rings. This facilitates disassembly for shave ring tooth sharpening.

Figure 6:
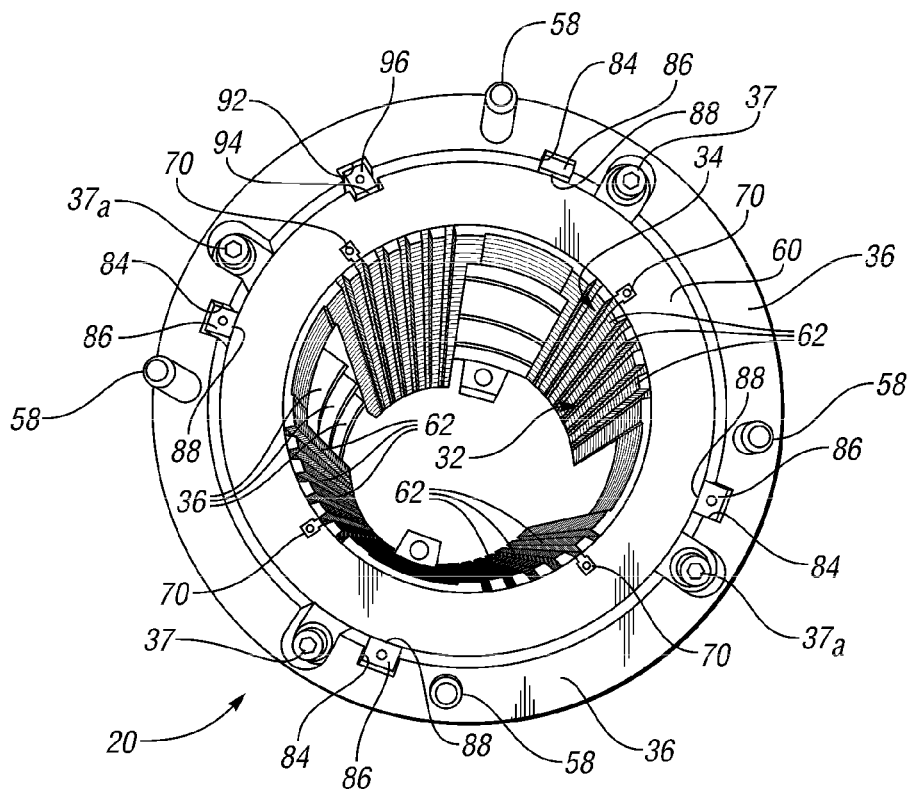
FIG. 6 is a perspective view looking generally upwardly at the lower end of the broach with a backing plate removed to better illustrate the construction of the broach.
Figure 7:
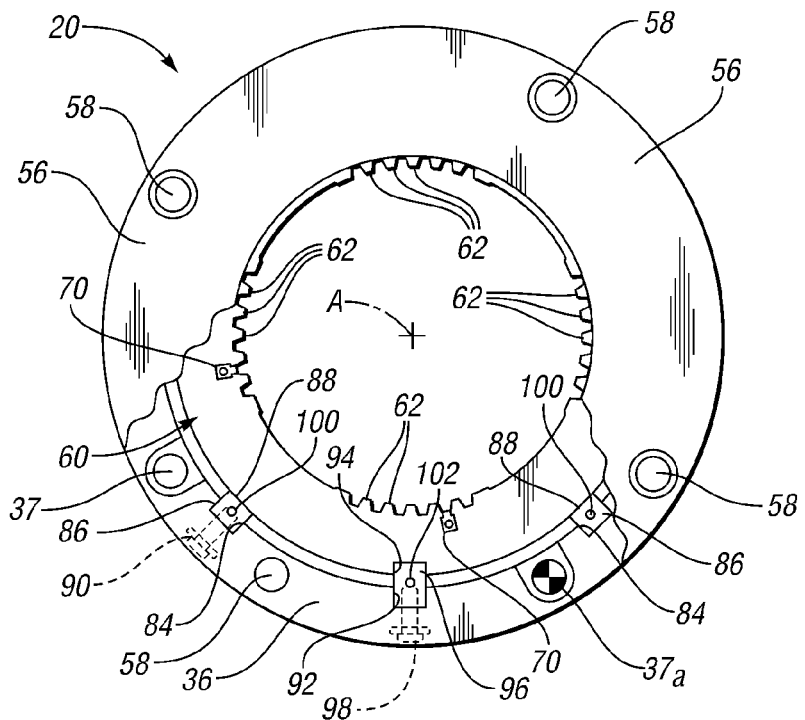
FIG. 7 is a bottom plan view taken along the direction of line 7-7 in FIG. 5 but with the backing plate of the broach partially broken away to better illustrate the construction of the shave ring section.

As shown in FIGS. 6 and 7, the broach shave ring section 34 includes one of the annular support rings 36 in which the shave rings 62 are received. This support ring 36 includes a plurality of internal locator slots 84 spaced circumferentially about the central axis. A plurality of locator keys 86 are respectively received within the locator slots 84 and have inner extremities 88 that contact and position the shave rings 62 concentrically about the central axis A. Bolts such as the one bolt 90 shown in FIG. 7 secure the locator keys 86 to the support ring 36.

As also shown in FIGS. 6 and 7, the support ring 36 of the shave ring section includes an internal indexing slot 92, and each shave ring includes a radial outer indexing slot 94 aligned with the support ring internal indexing slot 92. An indexing key 96 is received within the indexing slot 92 of the support ring 36 and within the indexing slots 94 of the shave rings to provide alignment of the internal teeth 62 of the shave rings and a bolt 98 secures the indexing key to the support ring 36.

Each locator key 86 has an axial end that includes a threaded hole 100 for facilitating removal of the locator keys from the locator slots 84 of the support ring 36 and the indexing key 96 includes an axial end having a threaded hole 102 that facilitates removal of the indexing key from the indexing slot 92 of the support ring and the indexing slots 94 of the shave rings. More specifically, a threaded bolt 104 as shown in hidden line representation in FIG. 5 facilitates this removal. Such removal of the locator keys 86 and the indexing key 96 like the removal of the guides 70 as described above also facilitates disassembly for sharpening of the shave ring teeth.

Figure 16:
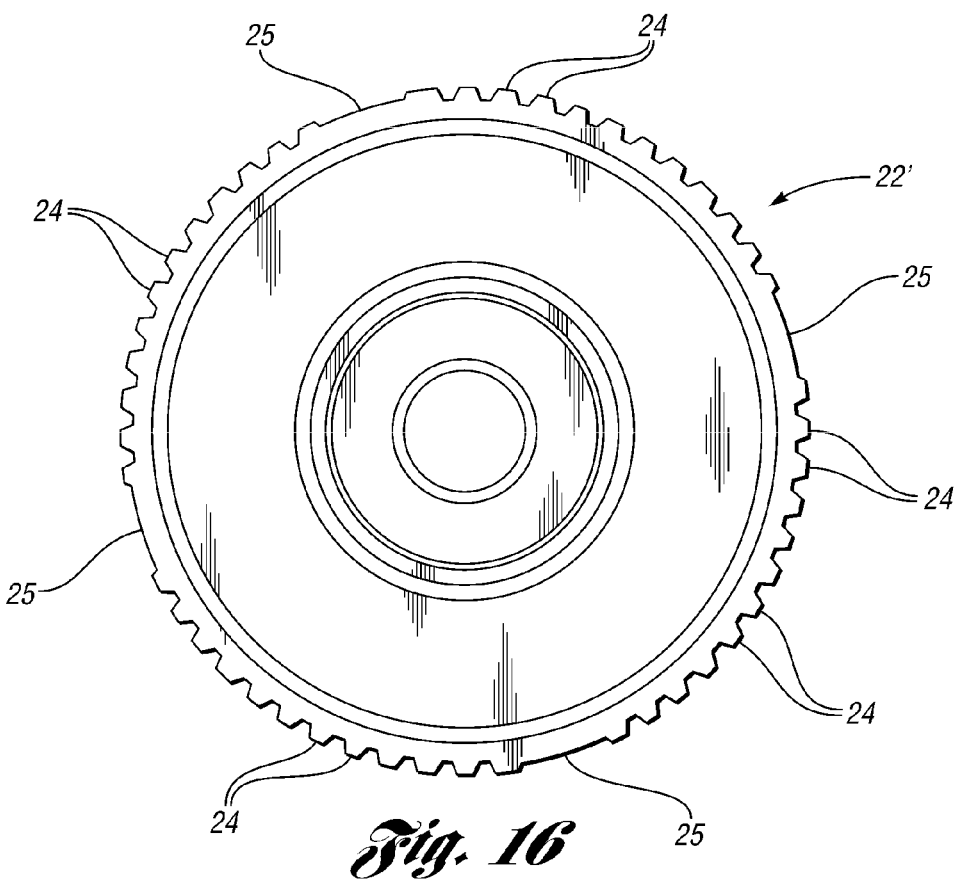
FIG. 16 is an axial view of another gear that is broached using the shave ring guides during final shaving of both the gear teeth of circumferentially spaced toothed segments and partially round spacings between the spaced toothed segments.
Figure 17:
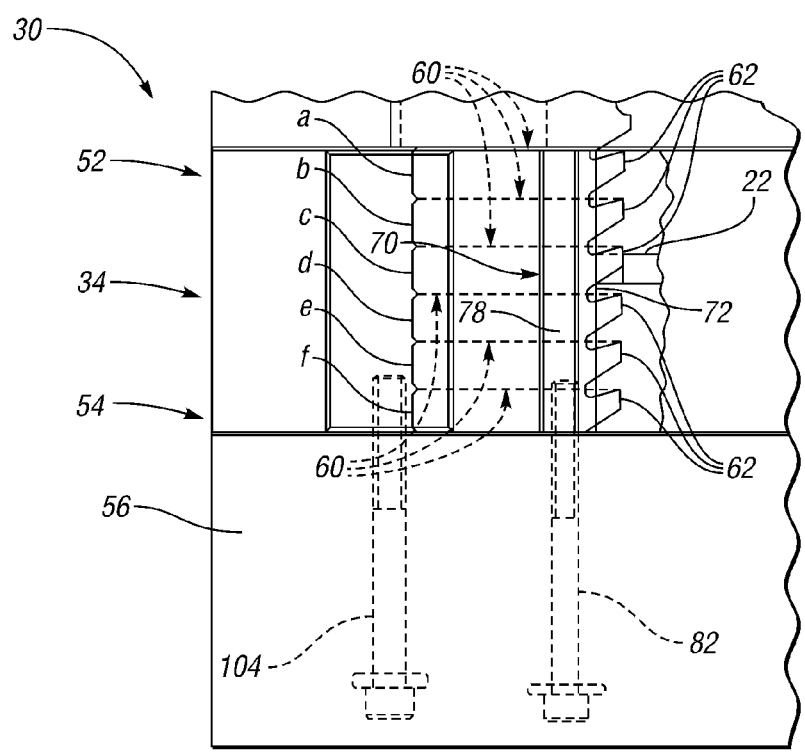
FIG. 17 is an enlarged view of a portion of FIG. 5 to further illustrate the shave ring teeth and guides of the shave ring section.

During the rough broaching at the rough broach section 32, the insert teeth 48 each have a depth of cut of about 0.001 to 0.0035 of an inch, while the shave ring teeth 62 of each shave ring of the shave ring section 34 have a depth of cut of about 0.0003 to 0.0015 of an inch. Furthermore, the rough broaching is performed on faces 28 and bottom lands 30 of the gear teeth 24 shown in FIG. 15, while the final shaving can be performed only on the faces 28 or can be performed on the faces and also at the bottom lands as described above. Of course, other broaching of round workpieces can use the centering guides with shave rings for final shaving. Furthermore, while the gear 22 shown in FIG. 14 is a spider gear with toothed segments (four as shown) spaced from each other, gears with teeth around their entire peripheries can also be broached with final shaving by shave rings having centering guides as described. In addition, gear 22' shown in FIG. 16 has toothed segments with teeth 24 that can be shaved in the ways ring described above and also has partially round surfaces 25 that are shaved in the shave section at locations between the toothed segments having the teeth 24. Also, the broach and its shave ring section have particular utility for broaching gears and the like when more accurate centering is needed or when the gear has a relatively thin axial dimension such that each shave ring as shown in FIG. 17 has its teeth 62 disengaged from the gear 22 before the teeth 62 of the next shave ring contact the gear.

While an embodiment of the invention has been illustrated and described, it is not intended that this embodiment illustrates and describes all possible forms of the invention. Rather, the words used in the specification are words of description rather than limitation, and it is understood that various changes may be made without departing from the spirit and scope of the invention.

What is claimed is:

1. A broach shave ring section comprising:
   a plurality of annular shave rings positioned along a central axis between entry and exit ends of the shave ring section;
   each shave ring having internal teeth and the teeth of the shave rings having progressively increasing size from the entry end of the shave ring section toward its exit end so as to perform final shaving of gear teeth on a rough broached gear and, between the internal teeth are bottom lands spaced a first radial distance from said central axis;
   at least three of said bottom lands but not all of said bottom lands having guide grooves extending axially through each shave ring at circumferentially spaced locations about the central axis and in alignment with the guide grooves of the other shave rings from one shave ring axially along the central axis to the next shave ring, and each guide groove having a radial inwardly opening shape toward the central axis; and
   guides respectively received within the guide grooves and having guide portions located at the inwardly opening shapes thereof to contact respective gear teeth of the gear to maintain the gear radially centered during the final shaving, said guide portions being spaced a second radial distance from said central axis, and said second radial distance being less than said first radial distance.

2. A broach shave ring section as in claim 1 wherein the guide grooves in the shave rings and the guides therein are equally circumferentially spaced from each other about the central axis.

3. A broach shave ring section as in claim 1 which includes four guide grooves in the shave rings and four guides therein.

4. A broach shave ring section as in claim 3 wherein the four guide grooves in the shave rings and the four guides therein are equally circumferentially spaced 90 degrees from each other about the central axis.

5. A broach shave ring section as in claim 1 wherein the guide grooves in the shave rings each have a mounting portion located radially outward from the internal teeth of the shave ring and having a larger size than the radial inwardly opening shape thereof, the radial inwardly opening shape of each guide groove being circumferentially between associated internal teeth of the shave ring, each guide including a mounting portion received within the mounting portions of the associated axially aligned mounting grooves of the shave rings, and each guide including a guide portion of a smaller size than the mounting portion thereof and located within the associated radial inwardly opening shape of the mounting grooves to contact and guide the radial outer extremity of an associated gear tooth of the gear to provide the gear centering.

6. A broach shave ring section as in claim 5 wherein the mounting portions of the shave ring guide grooves and the mounting portions of the guides have generally square shapes, and the guide portions having inwardly projecting shapes extending radially inward through the inwardly opening shapes of the mounting grooves to contact the radial outer extremities of associated gear teeth of the gear to provide the gear centering.

7. A broach shave ring section as in claim 1 wherein each guide includes an axial end having a threaded hole that facilitates removal of the guide from the associated guide grooves of the shave rings.

8. A broach shave ring section as in claim 1 further including an annular support ring in which the shave rings are received, the support ring including a plurality of internal locator slots spaced circumferentially about the central axis, a plurality of locator keys respectively received within the locator slots and having inner extremities that contact and position the shave rings, the support ring also including an internal indexing slot located circumferentially between two of the locator slots, each shave ring including a radial outer indexing slot circumferentially aligned with the indexing slots of the other shave rings, and an indexing key received within the indexing slot of the support ring and within the indexing slots of the shave rings to provide axial alignment of the internal teeth of the shave rings.

9. A broach shave ring section as in claim 8 wherein each locator key includes an axial end having a threaded hole that facilitates removal of the locator keys from the locator slots of the support ring, and the indexing key including an axial end having a threaded hole that facilitates removal of the indexing key from the indexing slot of the support ring and from the indexing slots of the shave rings.

10. A broach shave ring section comprising:
  a plurality of annular shave rings positioned along a central axis between entry and exit ends of the shave ring section;
  each shave ring having internal teeth and the teeth of the shave rings having progressively increasing size from the entry end of the shave ring section toward its exit end so as to perform final shaving of gear teeth on a rough broached gear and, between the internal teeth are bottom lands spaced a first radial distance from said central axis;
  at least three of said bottom lands but not all of said bottom lands having guide grooves extending axially through each shave ring at circumferentially spaced locations equally spaced about the central axis and in alignment with the guide grooves of the other shave rings from one shave ring axially along the central axis to the next shave ring, each guide groove having a radial inwardly opening shape toward the central axis, each guide groove having a mounting portion located radially outward from the internal teeth of the shave ring and having a larger size than the radial inwardly opening shape thereof, and the radial inwardly opening shape of each guide groove being circumferentially between associated internal teeth of the shave ring; and
  guides respectively received within the guide grooves of the shave rings and having guide portions located at the inwardly opening shapes of thereof to contact respective gear teeth of the gear to maintain the gear radially centered during the final shaving, each guide including a mounting portion received within the mounting portion of the associated axially aligned mounting grooves, and each guide including a guide portion of a smaller size than the mounting portion thereof and located within the associated radial inwardly opening shape of the mounting grooves to contact and guide the radial outer extremity of an associated gear tooth of the gear to provide the gear centering, and said guide portions being spaced a second radial distance from said central axis, and said second radial distance being less than said first radial distance;
  an annular support ring in which the shave rings are received, the support ring including a plurality of internal locator slots spaced circumferentially about the central axis, a plurality of locator keys respectively received within the locator slots and having inner extremities that contact and position the shave rings, the support ring also including an internal indexing slot located circumferentially between two of the locator slots, each shave ring including a radial outer indexing slot circumferentially aligned with the indexing slots of the other shave rings, and an indexing key received within the indexing slot of the support ring and within the indexing slots of the shave rings to provide alignment of the internal teeth of the shave ring.

11. A broach shave ring section as in claim 10 wherein each locator key includes an axial end having a threaded hole that facilitates removal of the locator keys from the locator slots of the support ring, and the indexing key including an axial end having a threaded hole that facilitates removal of the indexing key from the indexing slot of the support ring and from the indexing slots of the shave rings.

12. A broach comprising:
  a rough broach section having entry and exit ends, the rough broach section including a generally annular support and toothed inserts mounted by the support extending between the entry and exit ends of the rough broach section to rough broach a gear blank with outer gear teeth; and
  a shave ring section having entry and exit ends with its entry end at the exit end of the rough broach section, the shave ring section including a generally annular support and a plurality of annular shave rings mounted by the associated support positioned along a central axis between the entry and exit ends of the shave ring section;
  each shave ring having internal teeth and the teeth of the shave rings having progressively increasing size from the entry end of the shave ring section toward its exit end so as to perform final shaving of the gear teeth on the rough broached gear, and between the internal teeth are bottom lands spaced a first radial distance from said central axis;
  at least three of said bottom lands but not all of said bottom lands having guide grooves extending axially through each shave ring at circumferentially spaced locations equally spaced about the central axis and in alignment with the guide grooves of the other shave rings from one shave ring axially along the central axis to the next shave ring, each guide groove having a radial inwardly opening shape toward the central axis, each guide groove having a mounting portion located radially outward from the internal teeth of the shave ring and having a larger size than the radial inwardly opening shape thereof, and the radial inwardly opening shape of each guide groove being circumferentially between associated internal teeth of the shave ring;
  guides respectively received within the guide grooves and having guide portions located at the inwardly opening shapes of thereof to contact respective gear teeth of the gear to maintain the gear radially centered during the final shaving, each guide including a mounting portion received within the mounting portion of the associated axially aligned mounting grooves, and each guide including a guide portion of a smaller size than the mounting portion thereof and located within the associated radially inwardly opening shape of the mounting grooves to contact and guide the radial outer extremity of an associated gear tooth of the gear to provide the gear centering, and said guide portions being spaced a second radial distance from said central axis, and said second radial distance being less than said first radial distance; and
  the annular support of the shave ring section including a unitary annular support ring in which the shave rings are received, the support ring including a plurality of internal locator slots spaced circumferentially about the central axis, a plurality of locator keys respectively received within the locator slots and having inner extremities that contact and position the shave rings, the support ring also including an internal indexing slot located circumferentially between two of the locator slots, each shave ring including a radial outer indexing slot circumferentially aligned with the indexing slots of the other shave rings, and an indexing key received within the indexing slot of the support ring and within the indexing slots of the shave rings to provide alignment of the internal teeth of the shave ring.

* * * * *